US011990250B1

(12) United States Patent
Upadhay et al.

(10) Patent No.: US 11,990,250 B1
(45) Date of Patent: May 21, 2024

(54) TELECOMMUNICATIONS CABLE WITH OFFSET SEPARATOR

(71) Applicant: Sterlite Technologies Limited, Gurgaon (IN)

(72) Inventors: Abhishek Upadhay, Gurgaon (IN); Darshana Bhatt, Gurgaon (IN)

( * ) Notice: Subject to any disclaimer, the term of this patent is extended or adjusted under 35 U.S.C. 154(b) by 0 days.

(21) Appl. No.: 17/214,860

(22) Filed: Mar. 27, 2021

(30) Foreign Application Priority Data

Feb. 24, 2021 (IN) ............................ 202111007829

(51) Int. Cl.
*H01B 11/04* (2006.01)
*H01B 11/08* (2006.01)

(52) U.S. Cl.
CPC ............. *H01B 11/04* (2013.01); *H01B 11/08* (2013.01)

(58) Field of Classification Search
CPC ... H01B 7/02; H01B 7/04; H01B 7/08; H01B 11/002; H01B 11/02; H01B 11/04; H01B 11/08
USPC .... 174/110 R, 113 R, 113 C, 120 R, 113 AS, 174/120 SR, 120 AR, 121 R, 121 SR, 174/121 AR
See application file for complete search history.

(56) References Cited

U.S. PATENT DOCUMENTS

| | | | | |
|---|---|---|---|---|
| 6,800,811 B1 * | 10/2004 | Boucino | H01B 11/06 174/113 C |
| 7,405,360 B2 * | 7/2008 | Clark | H01B 11/06 174/113 AS |
| 7,772,494 B2 * | 8/2010 | Vexler | H01B 11/04 174/113 R |
| 9,316,801 B1 * | 4/2016 | Kithuka | G02B 6/4407 |
| 2006/0096777 A1 * | 5/2006 | Glew | H01B 11/04 174/113 C |
| 2007/0044995 A1 * | 3/2007 | Park | H01B 11/06 174/113 C |
| 2007/0102188 A1 * | 5/2007 | Glew | H01B 3/445 174/113 C |
| 2007/0144762 A1 * | 6/2007 | Stutzman | H01B 11/06 174/113 C |
| 2014/0262427 A1 * | 9/2014 | Brown | H01B 17/56 174/113 C |

* cited by examiner

*Primary Examiner* — William H. Mayo, III
(74) *Attorney, Agent, or Firm* — Steven R. Fairchild; Michael J. Pennington

(57) ABSTRACT

A telecommunications cable (100) has a jacket (110) and a separator (102). The separator (102) has a plurality of curved arms (104) and a plurality of primary arms (112*a*, 112*b*, 112*c*, 112*d*). Each end of the plurality of curved arms (104) is kept in contact with an inner surface of the jacket (110) to form a plurality of enclosed sections (114). The plurality of primary arms does not touch the inner surface of the jacket and is placed in an offset position relative to one another such that the plurality of primary arms is not aligned in line with one another creating an offset at a point of intersection. The plurality of primary arms has a plurality of equally distributed corrugations (116) projecting inwards towards the inner surface of the jacket (110).

9 Claims, 8 Drawing Sheets

100

102

TELECOMMUNICATIONS CABLE WITH OFFSET SEPARATOR

TECHNICAL FIELD

The present disclosure relates to a field of telecommunications cables and, more particularly relates to an offset separator for use in a telecommunications cable. This application claims priority from Indian application having application number 202111007829 filed on 24 Feb. 2021, the disclosure of which has been incorporated by reference herein.

BACKGROUND

In a telecommunications cable, data propagates via twisted pair conductors. A conventional twisted pair conductor generally includes two insulated conductors twisted together along a longitudinal axis of the telecommunications cable. The performance of the telecommunications cables having twisted pair conductors is evaluated utilizing parameters like impedance, dimensional properties, attenuation, cross-talk or the like.

Cross-talk is an important parameter that needs to be considered while designing the telecommunications cable. The twisted pair conductors emit electromagnetic fields around them. These electromagnetic fields often regard as noise or interference. These electromagnetic fields adversely affect signals carried by adjacent twisted pair conductors that may result in cross-talk. The cross-talk interferences are of different types and one of them is near-end cross-talk interference.

To control the near-end cross-talk interference, various physical characteristics of the twisted pair conductors of the telecommunications cable and their relationship to each other need to be taken into account. One of the physical characteristics that should be considered, while designing the telecommunications cable, is proper isolation arrangement of the twisted pair conductors from each other.

To control or reduce the near-end cross-talk/cross-talk interference and to protect cable cross-talk interference between the twisted pair conductors of high-speed conductors, the current techniques do not provide sufficient isolation. To provide the isolation between the twisted pair conductors, the conventional telecommunications cable employed with a filler or a separator. The filler separates the twisted pair conductors from each other by providing a physical separation between them. However, it has been noticed that some of the conventional telecommunications cables utilizing the fillers that contribute adversely and increase the exposure of their twisted pair conductors to near-end cross-talk. Thus, the conventional telecommunications cable with conventional filler does not comply with stringent near-end cross-talk testing of the telecommunications cable.

Consider an example of a 4 U separator of an Indian patent application IN201721017477A. The patent discloses a telecommunications cable including a plurality of twisted pairs of insulated conductors separated by 4 U separator. The 4 U separator forms four equal quadrants and are in the form of 4 Us with uniform thickness. The 4 U separator separates all four twisted pairs far enough to improve the near end cross talk. The quadrants of the 4 U separator are formed by three straight vertical arms and two straight horizontal arms such that the horizontal arms are passing through center of the telecommunications cable and is perpendicular to the vertical arms.

However, for the given 4 U separator, it becomes difficult to place the twisted pairs inside the quadrant. The 4 U separator arms are straight and the design is compact due to which the quadrant doesn't have enough space for the placement of the twisted pairs. Further, during bunching of the 4 U separator, outer vertical arms collapse, thereby making the manufacturing difficult. Because of the collapsing of the outer vertical arms, the manufacturing of the 4 U separator is not consistence and thus results in higher scrap. Due to the design complication, the 4 U separator cannot be made with smaller dimension which makes the cable having a much higher diameter.

Also, it has been observed that the twisted pairs experience a problem of internal cross talk due to insufficient spacing between the twisted pairs. Moreover, the 4 U separator is not compatible with all grades of polyolefin material, which provides limitation of material use as well.

Thus, there remains a need for an improved filler that can be used in the telecommunications cable.

Accordingly, the present invention seeks to ameliorate one or more of the aforementioned disadvantages or provide a useful alternative.

OBJECTIVE OF THE DISCLOSURE

A primary objective of the present disclosure is to improve the 4 U separator for use in a telecommunications cable and to provide an offset separator for use in the telecommunications cable.

Another objective of the present disclosure is to provide the offset separator with a plurality of curved arms.

Another objective of the present disclosure is to provide the offset separator with a plurality of primary arms being placed offset relative to one another.

Another objective of the present disclosure is to provide offset separator with primary arms being corrugated.

SUMMARY

Accordingly, a telecommunications cable is disclosed. The telecommunications cable comprises a jacket and a separator, wherein the separator has a plurality of curved arms. The plurality of curved arms are non-straight arms with some degree of curvature with the inner surface of the jacket. Each of the plurality of curved arms has ends in contact with an inner surface of the jacket that forms a plurality of enclosed sections between the plurality of curved arms and the inner surface of the jacket. The plurality of enclosed sections between the plurality of curved arms and the inner surface of the jacket has an equal area. Equal area of each of the plurality of enclosed sections enables non-distorted circular shape to the telecommunications cable. Also, the enclosed area provides enough separation to compensate the effect of alien cross talk from neighbouring telecommunications cables. Each of the plurality of curved arms has a length less than a circumference of the telecommunications cable so as to accommodate more number of curved arms within the telecommunications cable. The separator has a plurality of primary arms that does not touch the inner surface of the jacket. The separator further comprising the plurality of primary arms such that at least one primary arm of the plurality of primary arms is in contact with the plurality of curved arms forming the plurality of sections in the telecommunications cable. The separator further comprising the plurality of primary arms that is placed in an offset position relative to one another such that the plurality of primary arms is not aligned in line with one another creating an offset at a point of intersection. The separator comprising the plurality of primary arms that is placed in the offset position relative to one another such that a cross adjacent twisted pairs of insulated conductors are separated with at least a distance twice a thickness of the plurality of primary arms. The separator further comprising the plurality of primary arms having a plurality of equally distributed corrugations projecting towards the inner surface of the jacket.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

Figure 1:
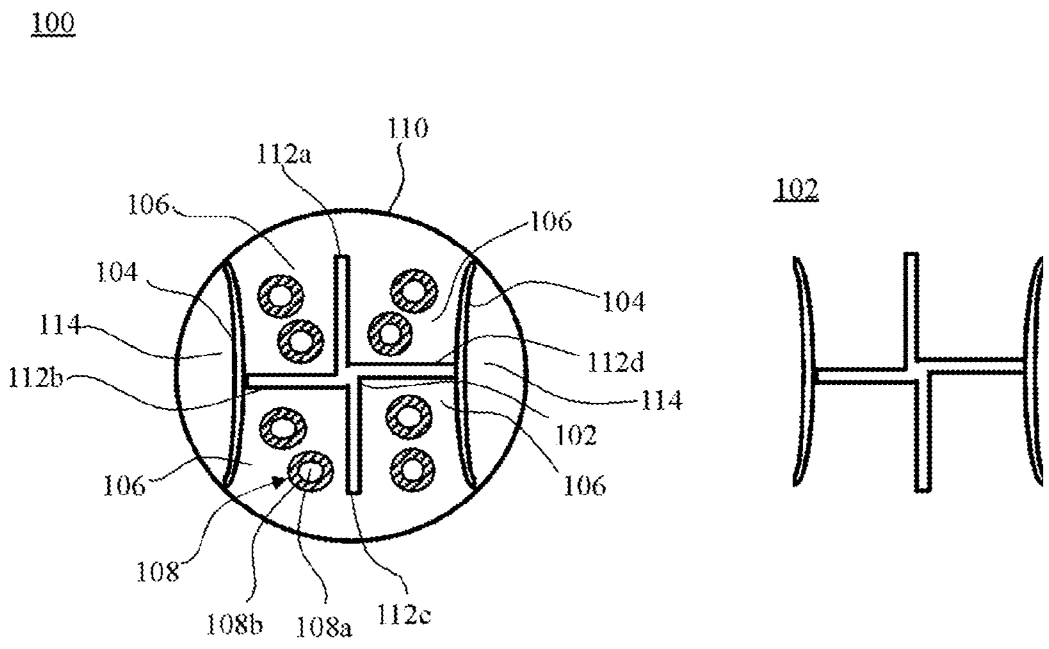

Having thus described the invention in general terms, reference will now be made to the accompanying drawings, which are not necessarily drawn to scale, and wherein:

FIG. 1 illustrates a cross-sectional view of a telecommunications cable with an offset separator.

FIGS. 2A-2H illustrate the telecommunications cable comprising various types of offset separator design with a plurality of curved arms.

Figure 3A:
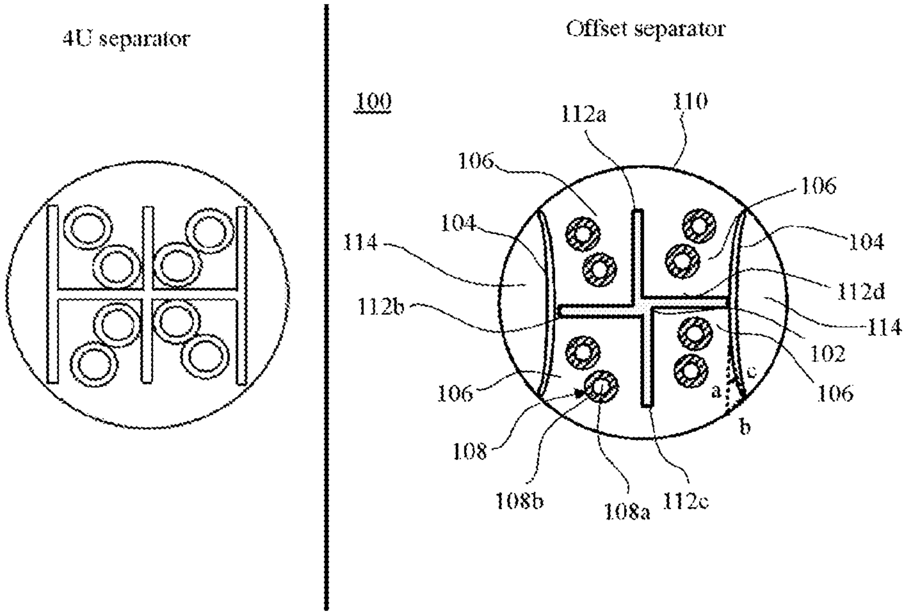

FIG. 3A illustrates a comparison of an existing 4 U separator with offset separator with respect to spacing inside quadrants.

Figure 3B:
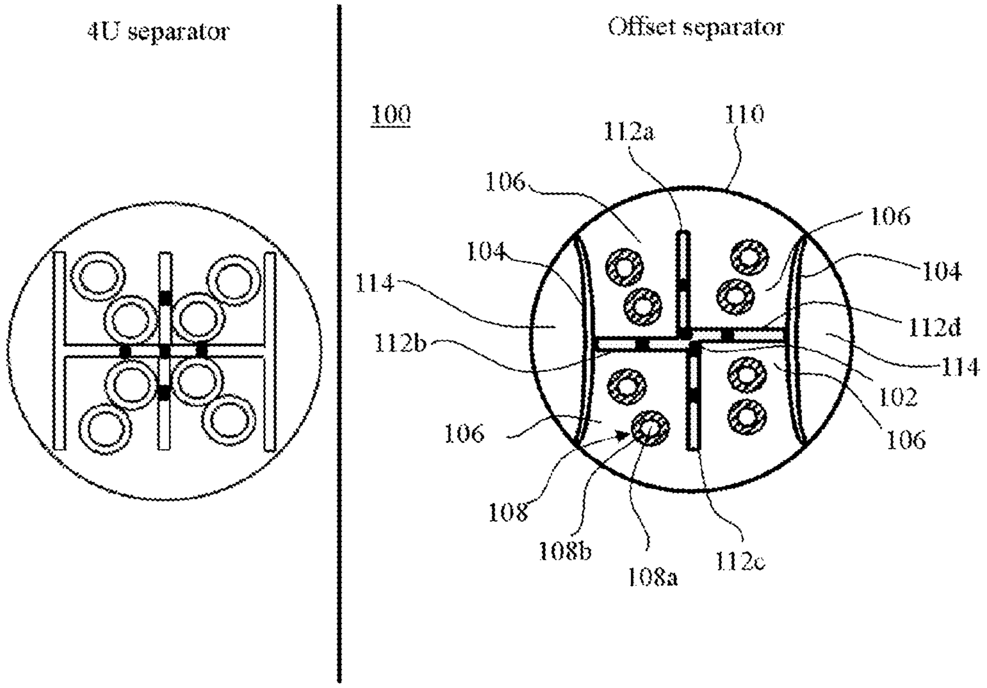

FIG. 3B illustrates a comparison of the existing 4 U separator with offset separator with respect to distance between adjacent pairs.

FIGS. 4A-4F illustrate various types of the offset configuration with primary arms.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION OF INVENTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Generally, the telecommunications cable is a type of guided transmission media that allows baseband transmissions from a transmitter to a receiver. The telecommunications cable is utilized for mass data transmission of a local area network. Further, the telecommunications cable is used for high-speed data rate transmission. The high-speed data rate transmission includes 1000BASE-T (Gigabit Ethernet) and 10 GBASE-T (10-Gigabit Ethernet) or other standards. The telecommunications cable is used for a wide variety of applications. For example, the telecommunications cable may be a twisted pair telecommunications cable. Specifically, the telecommunications cable may be an unshielded twisted pair telecommunications cable. The unshielded twisted pair telecommunications cable is a cable with two conductors twisted together. The conductors are twisted together to cancel out electromagnetic interference from internal and external sources.

Accordingly, the present disclosure provides an offset separator for use in a telecommunications cable. The key idea of the present disclosure is to place the offset separator in the telecommunications cable to make the telecommunications cable compliant with stringent near-end crosstalk testing. The key idea is to restrict movement of a plurality of twisted pairs of insulated conductors inside a plurality of sections to provide firm packing of bunched twisted pairs inside the telecommunications cable. Further, the key idea is to support alignment of the offset separator with the plurality of twisted pairs of insulated conductors against an outer jacket. Furthermore, the key idea is to manufacture the offset separator with low density polymeric material.

FIG. 1 illustrates a cross-sectional view of a telecommunications cable with an offset separator. The telecommunications cable (100) is hereinafter called as cable and the offset separator (102) is hereinafter called as separator. The cable (100) comprises a jacket (110) enclosing an arrangement of the separator (102). The separator (102) includes a plurality of curved arms (104) forming a plurality of enclosed sections (114) of an equal area. The separator (102) further has a plurality of primary arms forming a plurality of sections (106). The plurality of curved arms (104) touches an inner surface of the jacket (110). The plurality of sections (106) houses a plurality of twisted pairs of insulated conductors (108). The plurality of sections (106) may alternatively be called as air pockets.

The plurality of twisted pairs of insulated conductors (108) is used for transferring data and electrical signal. Each insulated conductor of the plurality of twisted pairs of insulated conductors (108) includes an electrical conductor (108*a*) and an insulation layer (108*b*). Each electrical conductor (108*a*) extends substantially along the longitudinal axis of the telecommunications cable (100) and twisted along its length. Each of the plurality of twisted pairs of insulated conductors (108) is helically twisted along its length. The plurality of twisted pairs of insulated conductors (108) is helically twisted together to minimize the cross talk in the cable (100). In case of four twisted pairs of insulated conductors (108), each of the four twisted pairs of insulated conductors includes two insulated conductors twisted together along a length of the insulated conductors.

Further, each twisted pair of insulated conductor of the plurality of twisted pairs of insulated conductors (108) includes a first electrical conductor and a second electrical conductor. The first electrical conductor is surrounded by a first insulation layer and the second electrical conductor is surrounded by a second insulated layer. Similarly, each of the four twisted pair conductors of the plurality of twisted pairs of insulated conductors (108) includes a third electrical conductor surrounded by a third insulation layer and a fourth electrical conductor surrounded by a fourth insulated layer. Each electrical conductor is 23 American wire gauge (hereinafter AWG) conductor that act as data transmission element of the telecommunications cable (100). Each electrical conductor may be of any suitable AWG size. The AWG is a standardized wire gauge system. The value of wire gauge indicates the diameter of the conductors in the cable. Each electrical conductor (108*a*) may be of circular shape. Each electrical conductor (108*a*) may be of other suitable shapes.

The electrical conductor (108*a*) of the plurality of twisted pairs of insulated conductors (108) is generally made of copper. Alternatively, the electrical conductor (108*a*) may be made of any other suitable conductor material.

Each electrical conductor (108*a*) is enclosed by the insulation layer (108*b*) and thus forms a twisted pair of insulated conductor (108). The insulation layer (108*b*) is made of special materials (referred to as insulators or a protective coating layer) for providing insulation from the neighbouring electrical conductors. The insulation layer (108*b*) provides electrical isolation for each electrical conductor (108*a*). The insulation material may have properties like high mechanical strength and high electrical resistance. The insulation material may be, but not limited to, polyolefin, fluoropolymer, foamed polyolefin, foamed fluoropolymer or combination thereof.

Figure 2A:
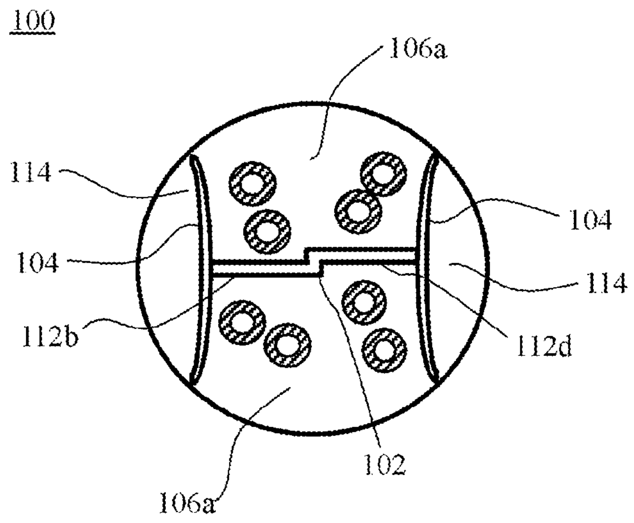
Figure 2B:
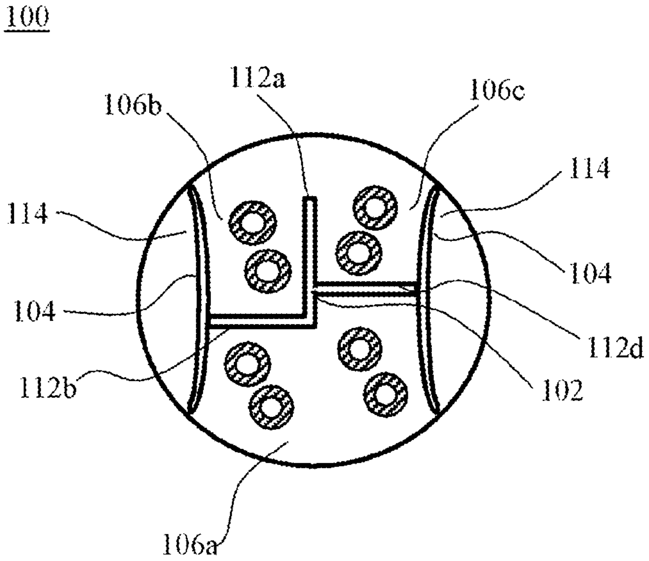
Figure 2C:
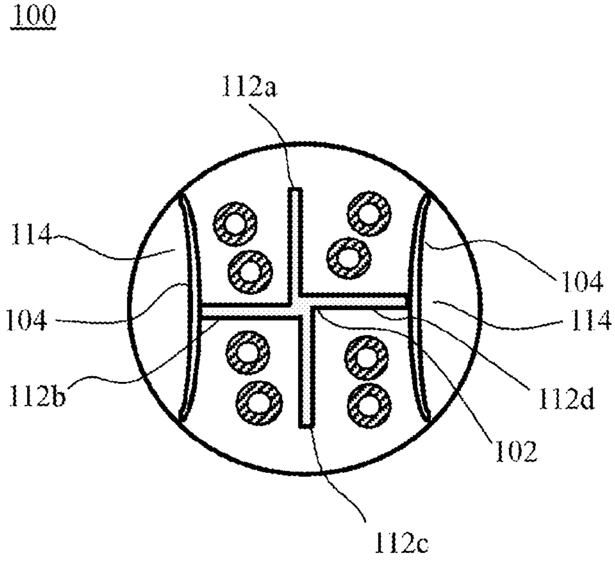

In an aspect, the insulation layer (108*b*) enclosing the electrical conductors may be coloured. Each insulation layer (108*b*) may have same or different colours and may be, but not limited to blue, green, orange, brown. Alternatively, the insulation layer (108*b*) may be transparent. The plurality of twisted pairs of insulated conductors (108) may be of any suitable diameter. FIGS. 2A-2H illustrate the telecommunications cable comprising various types of offset separator design with the plurality of curved arms and plurality of primary arms. The plurality of curved arms (104) forms the plurality of enclosed sections (114) with the inner surface of the jacket (110) while plurality of primary arms forms the plurality of sections (106) with the plurality of curved arms within the cable. The separator (102) has the plurality of primary arms (112*a*, 112*b*, 112*c*, 112*d*). The plurality of primary arms (112*a*, 112*b*, 112*c*, 112*d*) may have equal dimensions. Alternatively, the plurality of primary arms (112*a*, 112*b*, 112*c*, 112*d*) may have different dimensions. In an example, the separator (102) may have 2 primary arms as shown in FIG. 2A and FIG. 4F. In another example, the separator (102) may have 3 primary arms as shown in FIGS. 2B, 2D, 2E, 2G and 4D. In yet another example, the separator (102) may have 4 primary arms as shown in FIGS. 2C, 2F and 2H and FIGS. 4A, 4B, 4C and 4E. Advantageously, the separator (102) having the plurality of primary arms facilitates the placement of the plurality of twisted pairs of insulated conductors (108) far enough as compared to conventional separators resulting into higher margin of cross talk parameters. The plurality of primary arms (112*a*, 112*b*, 112*c*, 112*d*) may not touch an inner surface of the jacket (110). The plurality of curved arms facilitates formation of bigger plurality of sections (106) unlike existing 4 U separator that has straight arms. Also, the plurality of curved arms (104) enables the separator to be manufactured easily with higher bunching speed. The plurality of primary arms (112*a*, 112*b*, 112*c*, 112*d*) forms the plurality of sections (106) (as shown in FIG. 1) that facilitates wide separation of the plurality of twisted pairs of insulated conductors (108). The plurality of sections (106) formed is in a range of 2-4. Each of the plurality of sections may be of same size. Alternatively, each of the plurality of sections may be of different sizes. Moreover, the size of the plurality of sections is dependent upon a number of the primary arms of the separator. For example (as shown in FIG. 2B, FIG. 2D, FIG. 2E, FIG. 2G and FIG. 4D), the separator has three primary arms and three sections. Out of three sections, one of the plurality of sections (106*a*) is larger than other two sections (106*b* and 106*c*) for placing plurality of twisted pairs of insulated conductors (108). Similarly FIG. 2A and FIG. 4F has two primary arms and two same sized sections (106*a*) for placing the plurality of twisted pairs of insulated conductors (108).

Figure 2D:
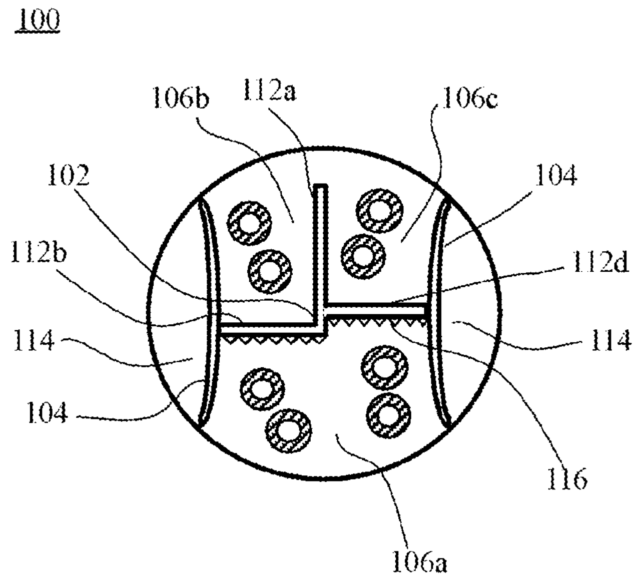
Figure 2E:
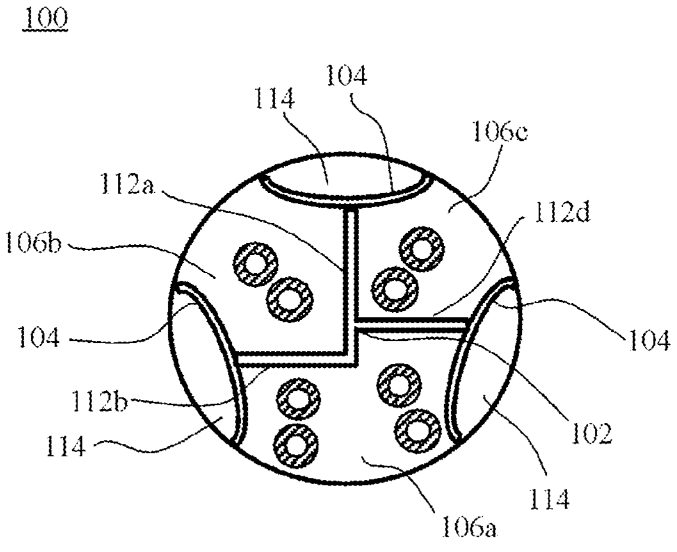
Figure 2F:
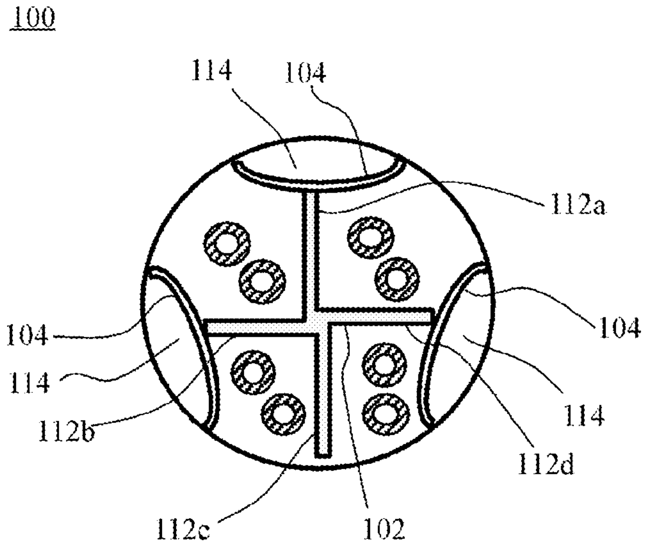
Figure 2G:
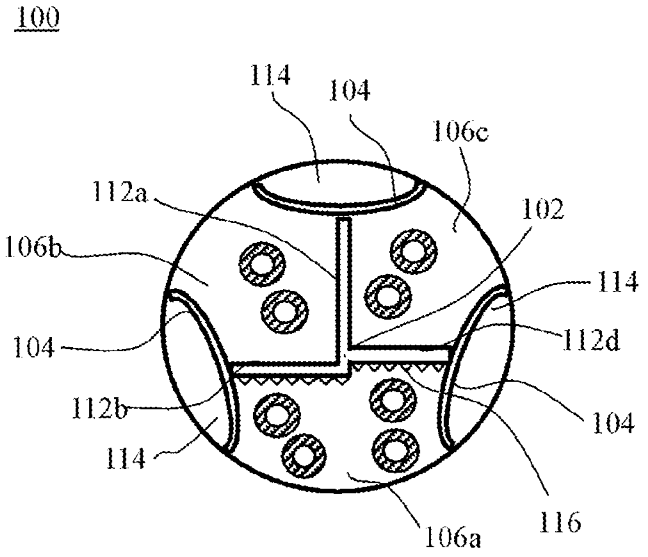
Figure 2H:
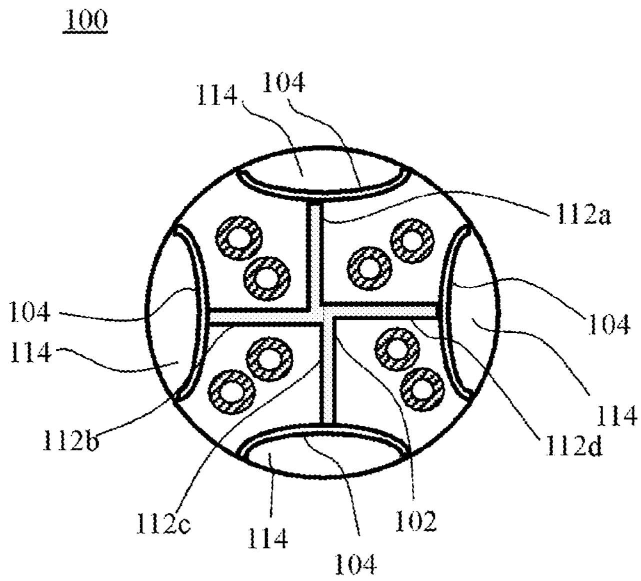

The separator (102) has at least one primary arm from the plurality of primary arms corrugated (as shown in FIGS. 2D and 2G). The corrugations (116) are in the form of equally distributed plurality of protrusions on at least one of primary arms projecting towards the inner surface of the jacket (100). That is, the plurality of primary arms has a plurality of equally distributed corrugations (116) projecting towards the inner surface of the jacket (110). Each of the corrugations may be equally placed. The corrugations may have a triangular shape, a square shape, a rectangular shape, a parabolic shape and the like. Advantageously, imparting corrugations on the plurality of primary arms results into less utilization of materials and enables a space of accommodating air that further improves the internal cross talk.

The separator (102) may have the plurality of curved arms (104) (as shown in FIGS. 2A to 2H). In an implementation, at least two primary arms of the plurality of primary arms (112*b*, 112*d*) rest on at least two curved arms of the plurality of curved arms (104). The plurality of curved arms (104) forms the plurality of enclosed sections (114) with the inner surface of the jacket (110). In an example, two curved arms (104) and four primary arms (112*a*, 112*b*, 112*c*, 112*d*) form four sections (106). The plurality of sections (106) may have an equal area. Alternatively, the plurality of sections (106) may have different areas. A length of each of the plurality of curved arms (104) is less than a circumference of the cable (100). Advantageously, during manufacturing of the separator with the plurality of curved arms (104), the plurality of curved arms (104) tends not to collapse thereby enabling easy placement of the plurality of twisted pairs of insulated conductors (108) during a bunching process due to which, the cable (100) can be manufactured with persistent round shape with least efforts. Further, the telecommunications cable will be consistent with the manufacturing process without any irregularity in the manufacturing resulting in less or no scrap. Furthermore, the plurality of curved arms (104) enables the separator to have more space facilitating easy placement of pairs within the plurality of sections. The separator having the plurality of curved arms (104) has enough space to accommodate air inside the cable that improves insertion loss and propagation delay and PSAACRF parameters of the cable. Moreover, due to unique separator design having the plurality of curved arms (104) (as shown in FIG. 2A-2H), the separator can be made with smaller dimension with low density polymeric material including, but not limited to, LDPE, MDPE.

The separator (102) may align with a centre of the cable (100). Alternatively, the separator (102) may not align with the centre of the cable (100). The separator (102) enables the cross adjacent twisted pairs of insulated conductors (108) of the cable (100) to be separated with a distance of at least twice the thickness of the plurality of primary arms. The separator (102) having the plurality of curved arms (104) enables the twisted pairs of insulated conductors (108) (especially the cross adjacent twisted pairs) to be placed far enough as compared to conventional separator resulting into higher margin of cross talk parameters.

The plurality of curved arms (104) has a length less than the circumference of the cable (100). The plurality of curved arms (104) has a curvature (0) of 1.5 to 5.5 degrees with the inner surface of the jacket. The plurality of curved arms needs to have a curvature of at least 1.5 degrees as the curvature below this value will make the arms straight and will create problem in placing the twisted pairs of insulated conductors (108) in the plurality of sections (106) while the curvature of more than 5.5 degrees results in enlarged enclosed sections (114) and thus will increase the diameter of the telecommunications cable. In an example, the plurality of primary arms (112*a*, 112*b*, 112*c*, 112*d*) may have an arm length in a range of 1.5 mm to 2.8 mm. The plurality of primary arms needs to have a length of 1.5 mm, less than this will not provide enough separation between the twisted pairs of insulated conductors (108) resulting in worse near-end cross-talk performance while the length more than 2.8 will require more material and make the telecommunications cable costly and bulky. The plurality of curved arms (104) may have an arm length of 4 mm to 5.8 mm. The plurality of curved arm needs to have a length of 4 mm as less than this will not be consistent with the separator design while the length more than 5.8 mm will require more material and make the telecommunications cable costly and bulky. The plurality of primary arms and plurality of curved arms may have a thickness of 0.2 mm-0.6 mm. The thickness of the plurality of primary arms and the plurality of curved arms needs to be 0.2 mm as less than this results into a separator with poor mechanical strength and cause collapsing of separator during manufacturing while thickness more than 0.6 mm will require more material, thereby making the telecommunications cable costly and bulky.

The plurality of twisted pairs of insulated conductors (108) extends substantially along the longitudinal axis of the cable (100) and may be placed in any manner in the plurality of sections (106) of the cable (100).

The separator (102) physically separates/isolates each of the plurality of twisted pairs of insulated conductors (108) from each other within the cable (100). The separator (102) extends along the length of the cable and separate the core of the cable into the plurality of sections (106). In an aspect, the plurality of sections may be two, three or four. In case of four sections (as shown in FIG. 1), each of the plurality of sections includes the pair of twisted insulated conductors along the length of the cable (100). In case of three sections, two of the sections may include the single pair of twisted insulated conductors each and one of the sections may include two pairs of twisted insulated conductors along the length of the cable.

The separator (102) made of a Medium Density Poly Ethylene (MDPE) material. Alternatively, the separator (102) made of a material selected from a group of low density polyethylene (LDPE), low smoke zero halogen, foamed polyethylene, polyethylene, polyvinyl chloride, polypropylene, foamed polypropylene or combination thereof.

Advantageously, the separator with the curved arms facilitates easy placement of the plurality of twisted pairs of insulated conductors within the plurality of sections. It also creates air gap inside the plurality of sections that improves insertion loss and propagation delay and PSAACRF (Power Sum Alien Attenuation To Crosstalk Ratio Far-End) parameters as disclosed above. To explain this further, referring to FIG. 3A. FIG. 3A illustrates a comparison of an existing 4 U separator with the separator of the present disclosure with respect to spacing inside the plurality of sections. The separator forms an extra space as compared to the 4 U separator near to the plurality of curved arms (104). The extra spacing is equal to an area of a triangle (a, b, c) formed at end-points of the plurality of curved arms as shown in the FIG. 3A. For illustration purposes, the triangle is shown. In other words, the plurality of sections of the separator has more space as compared to the existing 4 U separator as shown in FIG. 3A. Due to the plurality of curved arms of the separator, a triangle is formed near its curved arms as shown in FIG. 3A. The extra space can be determined by implementing heron's formula. To determine the extra space, consider the triangle formed at the curved arms has sides a=0.5 mm, b=0.7 mm and c=0.86 mm (taken from a prototype, only for illustration purposes). From herons formula, the area of triangle is calculates as:

$$S = (a + b + c)/2 = (0.5 + 0.7 + 0.86)/2 = 1.03 \text{ mm}$$

$$\text{Area of triangle } (A) = \sqrt{S(S-a)(S-b)(S-c)}$$

$$A = \sqrt{1.03(1.03-0.5)(1.03-0.7)(1.03-0.86)}$$

$$A = 0.1749 \text{ mm}^2$$

Thus, the extra spacing in all sections (106) is equal to 4×0.1749 $mm^2$ i.e. 0.6996 $mm^2$. So, each section will have approximately 0.1749 $mm^2$ extra space, when compared with 4 U separator. Hence, the entire cable will have approximately 4×0.1749=0.69 $mm^2$ air space when made with separator (102). This extra spacing will enable easy placement of the plurality of twisted pairs of insulated conductors (108) within the sections of the separator and improves insertion loss and propagation delay and PSAACRF (Power Sum Alien Attenuation To Crosstalk Ratio Far-End) parameters.

Further, due to formation of the plurality sections, each of the plurality of twisted pairs of insulated conductors (108) can be placed easily without any efforts. On the other hand, in combined sections (106*a*) (as shown in FIG. 2B, FIG. 2D, FIG. 2E, FIG. 2G), a pair from the plurality of twisted pairs of insulated conductors (108) with higher lay length is placed together with another pair of the plurality of twisted pairs of insulated conductors (108) having shorter lay length to eliminate the problem of crosstalk. Conclusively, each pair is placed in separate sections that provides enough spacing between adjacent pairs that further provides higher margin of cross talk parameters.

Due to unique separator design, more specifically separator with the curved arms, the separator can be made efficiently using any grade of polymeric material as mentioned above.

The plurality of primary arms is placed in such a manner that at least one primary arm of the plurality of primary arms is in contact with the plurality of curved arms (104) forming the plurality of sections (106) in the cable. Further, the plurality of primary arms is placed in an offset position relative to one another such that the plurality of primary arms is not aligned in line with one another creating an offset at a point of intersection. Further, due to offset placement of the plurality of primary arms (112*a*, 112*b*, 112*c*, 112*d*), the plurality of twisted pairs of insulated conductors (108) especially the cross adjacent pairs are placed far enough that provides higher margin of cross talk parameters. For example, referring to FIG. 3B, FIG. 3B illustrates a comparison of the existing 4 U separator with the offset separator with respect to distance between adjacent pairs. With the existing 4 U separator, a maximum space separating cross adjacent twisted pairs of insulated conductors will be equal to a thickness of the plurality of primary arms which is not sufficient for higher margin of near end cross talk. While in case of offset separator, due to the offset configuration of the plurality of primary arms, the distance between the cross adjacent twisted pairs are twice the thickness of the plurality of primary arms. In case of the 4 U separator, as shown in FIG. 3B, the 4 U separator is constructed with the thickness of primary arms (indicated as solid lines) as 0.4 mm. As thickness of the 4 U separator's arms is 0.4 mm, thus the distance between any adjacent pair will be 0.4 mm Even for the cross adjacent pairs, the distance will around 0.4 mm.

Similarly, in case of the separator (102), as shown in FIG. 3B, the thickness of the arms is same as 4 U separator, which is 0.4 mm, so the distance between any adjacent pairs will be equal to 0.4 mm. However, due to offset primary arms, the distance between cross adjacent pairs will be twice the thickness of arms which is equal to 2×0.4 mm=0.8 mm. So, cross adjacent twisted pairs of the separator will be separated by a distance of 0.8 mm as mentioned earlier and thereby providing a higher margin of cross talk as compared to the 4 U separator.

The separator placed along with the plurality of twisted pairs of insulated conductors (108) is enclosed by the jacket (110). The separator (102) forms the plurality of sections (106) making it closely aligned with the plurality of twisted pairs of insulated conductors (108) as each pair can be placed easily within the plurality of sections during manufacturing. Further, the separator is properly aligned with the plurality of twisted pairs of insulated conductors (108) against the jacket (110). Due to the plurality of enclosed sections (114) formed by the plurality of curved arms with inner surface of the jacket, the separator (102) remains intact during bunching with the core and thus easily gets round shape during sheathing/jacketing with less scrap. Also, the plurality of enclosed sections (114) provides enough separation to compensate the effect of alien cross talk from neighbouring telecommunications cables. Furthermore, due to unique design of the separator, the separator can be made with smaller dimension with low density materials with ease.

The jacket (110) provides insulation from neighbouring cables and mechanical stability to the cable (100). The jacket (110) may be made of low smoke zero halogen, foamed polyethylene, polyethylene, polyvinyl chloride, polypropylene, foamed polypropylene, polymeric material or the like.

Figure 4A:
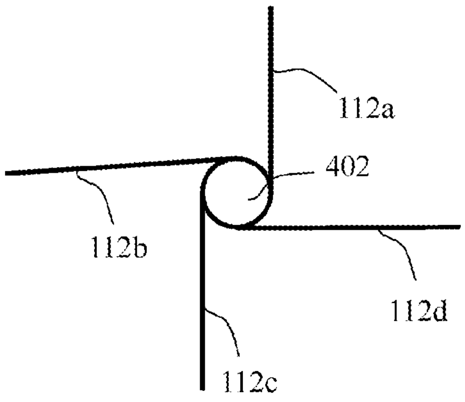
Figure 4B:
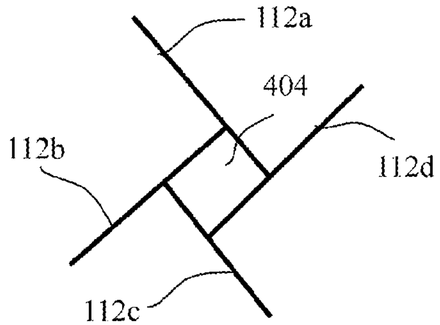
Figure 4C:
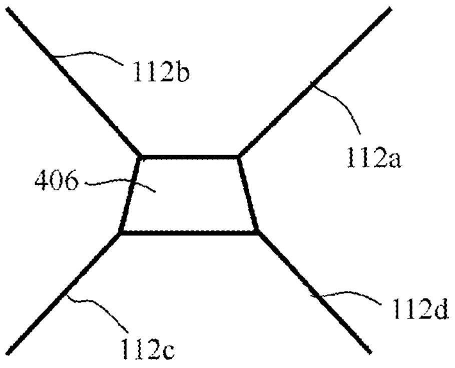
Figure 4D:
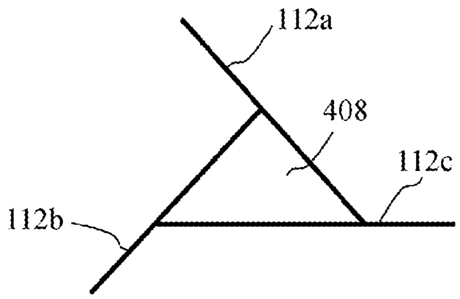
Figure 4E:
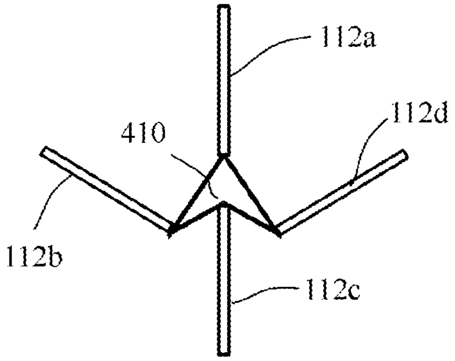
Figure 4F:

FIGS. 4A-4F illustrate various types of the offset configuration with the plurality of primary arms for the separator. In the examples, from (FIG. 4A—FIG. 4F), the offset arrangement or configuration of at least two primary arms can be created by placing different shape/structure at a point of intersection. The offset primary arms for the separator, as shown in FIG. 4A, is created by placing a circular structure (402) at the point of intersection of the plurality of primary arms (112*a*, 112*b*, 112*c*, 112*d*). The offset primary arms for the separator, as shown in FIG. 4B, is created by placing a rhombus structure (404) at the point of intersection of the plurality of primary arms (112*a*, 112*b*, 112*c*, 112*d*). The offset primary arms for the separator, as shown in FIG. 4C, is created by placing a trapezoidal structure (406) at the point of intersection of the plurality of primary arms (112*a*, 112*b*, 112*c*, 112*d*). The offset primary arms for the separator, as shown in FIG. 4D, is created by placing a triangular structure (408) at the point of intersection of the plurality of primary arms (112*a*, 112*b*, 112*c*) and the offset primary arms for the separator, as shown in FIG. 4E, is created by placing a quadrilateral structure (410) at the point of intersection of the plurality of primary arms (112*a*, 112*b*, 112*c*, 112*d*). Any other shape can also be possible to achieve the offset configurations with the plurality of primary arms. Also, the offset configuration of the plurality of primary arms can also be created by placing two primary arms (112*a*, 112*b*) which are not in line with each other as shown in FIG. 4F. All the different structures discussed above are part of offset separator and manufactured using the respective shape separator dies. Further, the offset configuration of the plurality of primary arms can also be created by placing four primary arms which are not in line with each other as shown in FIG. 1.

The telecommunications cable (100) may have any suitable value of diameter. The telecommunications cable (100) have compact design. Due to compact design and reduced telecommunications cable diameter, more telecommunications cable can be placed within a conduit during installation. The telecommunications cable (100) are compatible with existing connector specification.

The aforementioned structural elements enable an improvement in a plurality of characteristics of the telecommunications cable (100). The plurality of characteristics includes electrical properties and transmission characteristics. The electrical properties include input impedance, conductor resistance, mutual capacitance, resistance unbalance, capacitance unbalance, propagation delay and delay skew. The transmission characteristics include attenuation, return loss, near end crosstalk, attenuation to crosstalk ratio far end, alien cross talk, power sum attenuation to crosstalk ratio at far end, Transverse conversion loss and power sum alien near end cross talk.

The telecommunications cable (100) is designed to reduce attenuation and crosstalk. Attenuation may be defined as reduction in strength of a signal travelling through the telecommunications cables (100). The crosstalk may be the near end cross talk, alien cross talk or the like. The near end crosstalk is an error condition describing the occurrence of a signal from one wire pair radiating to and interfering with the signal of another wire pair. Similarly, the alien crosstalk is electromagnetic noise occurring in a telecommunications cables (100) running alongside one or more other signal-carrying cables. The term "alien" is used as alien crosstalk occurs between different cables in a group or bundle and not between individual wires or circuits within a single cable.

The telecommunications cables (100) adheres to the standards ANSI/TIA 568.2-D and ISOI/IEC 11801.

The present invention provides various advantages over the prior art. The telecommunications cables (100), with specially designed offset separator or (filler), provides protection against alien cross talk from surrounding cables at all frequency range because of the plurality of curved arms. Due to the plurality of curved arms, the separator doesn't buckle during bunching. Further, the separator restricts movement of the plurality of twisted pairs of insulated conductors (108) inside the plurality of sections and provides firm packing of bunched pairs (i.e. the plurality of twisted pairs of insulated conductors (108)) inside the telecommunications cable (100)). The separator is aligned with the plurality of twisted pairs of insulated conductors (108) against the jacket (110).

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A telecommunications cable (100), comprising:

a jacket (110); and a separator (102), wherein the separator has a plurality of curved arms (104), wherein each of the plurality of curved arms (104) has ends in contact with an inner surface of the jacket (110) that forms a plurality of enclosed sections (114) between the plurality of curved arms (104) and the inner surface of the jacket (110).

2. The telecommunications cable (100) as claimed in claim 1, wherein the plurality of enclosed sections (114) between the plurality of curved arms (104) and the inner surface of the jacket (110) has an equal area.

3. The telecommunications cable (100) as claimed in claim 1, wherein each of the plurality of curved arms (104) has a length less than a circumference of the telecommunications cable (100).

4. The telecommunications cable (100) as claimed in claim 1, wherein the separator has a plurality of primary arms (112*a*, 112*b*, 112*c*, 112*d*) that does not touch the inner surface of the jacket.

5. The telecommunications cable (100) as claimed in claim 1, wherein the separator (102) further comprising the plurality of primary arms such that at least one primary arm of the plurality of primary arms is in contact with the plurality of curved arms (104) forming the plurality of sections (106) in the telecommunications cable.

6. The telecommunications cable (100) of claim 1, wherein the separator (102) further comprising the plurality of primary arms that is placed in an offset position relative to one another such that the plurality of primary arms is not aligned in line with one another creating an offset at a point of intersection.

7. The telecommunications cable (100) of claim 1, wherein the separator (102) comprising the plurality of primary arms that is placed in the offset position relative to one another such that a cross adjacent twisted pairs of insulated conductors (108) are separated with at least a distance twice a thickness of the plurality of primary arms.

8. The telecommunications cable (100) as claimed in claim 1, wherein the separator (102) further comprising the plurality of primary arms having a plurality of equally distributed corrugations (116) projecting towards the inner surface of the jacket (110).

9. The telecommunications cable (100) as claimed in claim 1, wherein the separator (102) further comprising the plurality of primary arms having the plurality of equally distributed corrugations (116) projecting towards the inner surface of the jacket (110) such that each of the corrugations may have a triangular shape, a square shape, a rectangular shape, or a parabolic shape.

* * * * *